United States Patent Office 3,833,714
Patented Sept. 3, 1974

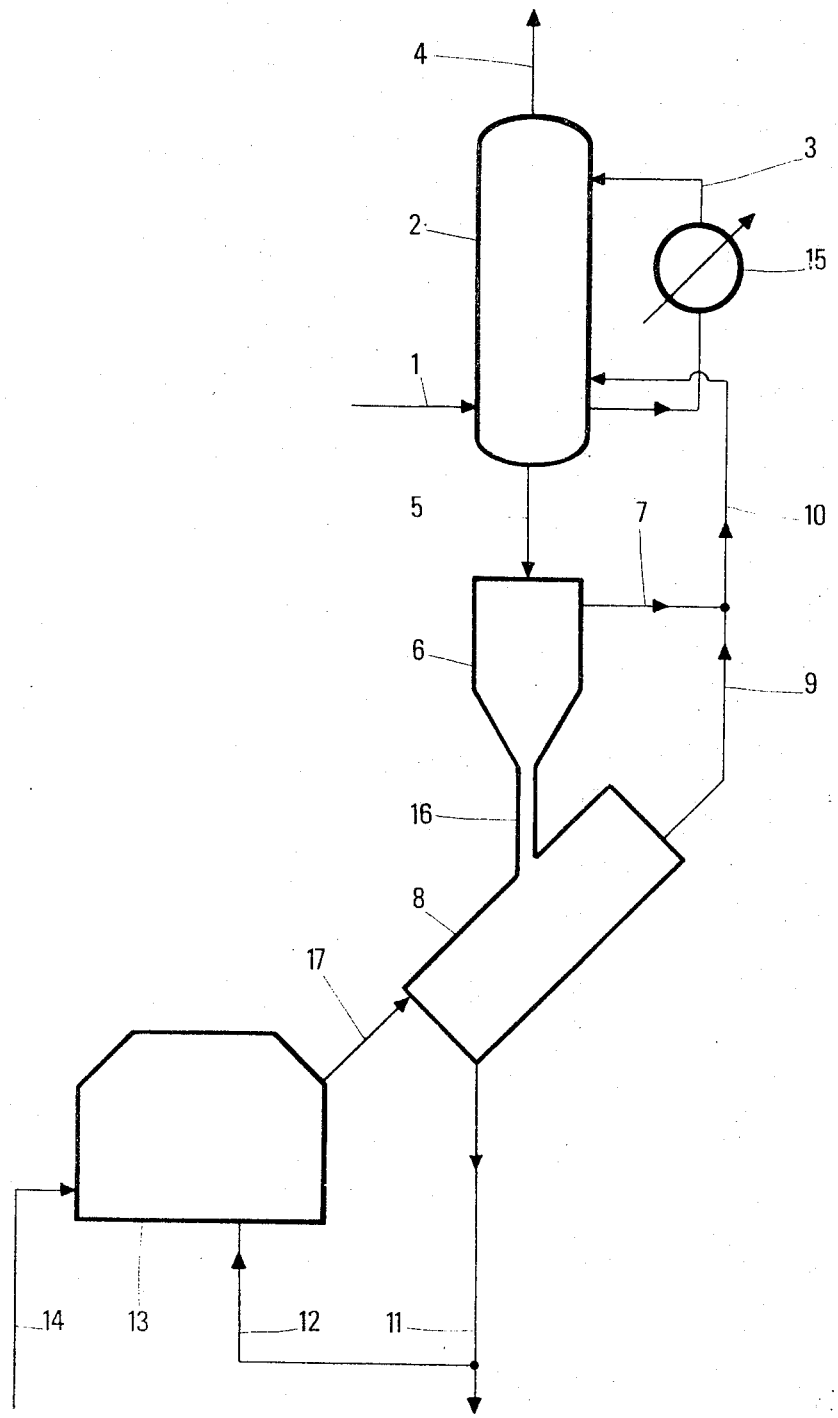

3,833,714
REMOVAL OF THE HYDROGEN SULFIDE CONTAINED IN A GAS OF HIGH CARBON DIOXIDE CONTENT
Philippe Renault, Noisy-le-Roi, Andre Deschamps, Chatou, and Claude Dezael, Maisons-Laffitte, France, assignors to Institute Francais du Petrole, des Carburants et Lubrifiants, Rueil-Malmaison, France
Filed June 19, 1972, Ser. No. 264,374
Claims priority, application France, June 24, 1971, 7123180
Int. Cl. C01b 17/00, 17/60; C01c 1/10
U.S. Cl. 423—567
10 Claims

ABSTRACT OF THE DISCLOSURE

Process for removing hydrogen sulfide from a gas containing the same in admixture with a large amount of carbon dioxide, comprising the successive steps of contacting said gas with an aqueous solution of ammonium sulfite so as to form ammonium thiosulfate, decomposing the latter to sulfur, ammonia, sulfur dioxide and water, recovering said sulfur and recycling said ammonia, sulfur dioxide and water to the contact zone in order to regenerate the ammonium sulfite solution.

---

The present invention concerns the removal of the hydrogen sulfide contained in a gas of high carbon dioxide content.

Hydrogen sulfide is an important factor of pollution of the air and it is necesary to remove it from various gaseous effluents discharged to the atmosphere.

By effluent of high carbon dioxide content, there is meant a gas which, in addition to the hydrogen sulfide, may contain exclusively carbon dioxide or may contain at least 3% by volume of carbon dioxide. It may consist for example, of an effluent issuing from an unit of purification of a synthesis gas by means of a process which is not selective with respect to $H_2S$ and $CO_2$ as, for example, an absorption by an organic or inorganic base.

In the presence of carbon dioxide, the washing of such gaseous effluents with absorbing alkaline solutions results in the formation of carbonates together with sulfides. During the regeneration of these solutions, the two acid gases are liberated and the proportion of hydrogen sulfide in such effluents is often so low that the conversion according to the conventional processes is either impossible or very expensive.

It has now been found that ammonium sulfite, which reacts only with hydrogen sulfide to form ammonium thiosulfates and which, moreover, is not influenced by carbon dioxide, constitutes a selective medium which permits the separation of $H_2S$ from $CO_2$.

The process according to the invention is particular in that it converts the hydrogen sulfide contained in the treated gas into ammonium thiosulfate and makes use of the products resulting from the thermal decomposition of the thiosulfate for regenerating the absorbing solution. A portion of the produced sulfur may be oxidized or burnt for quantitatively restoring the absorbing solution according to the amount of hydrogen sulfide to be converted.

In a first stage, a gas containing carbon dioxide and hydrogen sulfide is contacted with an aqueous solution of ammonium sulfite at a temperature preferably from 0 to 90° C. and more preferably of about 40° C. The amount of sulfite in contact with the gas to be treated is preferably such that the molar ratio $H_2S/SO_2$ in this stage be from 0.2 to 1 and preferably close to 0.5. The sulfite solution contains ammonium neutral sulfite and hydrogen sulfite at a concentration from 1 g./liter up to the saturation and preferably from 200 to 600 g./liter. Moreover, the molar ratio $NH_3/SO_2$ in such solutions is advantageously from 1.4 to 2 and preferably close to 1.5.

The purified effluent evolving from the first zone is substantially free from hydrogen sulfide.

The second stage of the process consists of heating the solution of high ammonium thiosulfate content, issuing from the first stage, to a sufficient temperature i.e. preferably from 80 to 170° C. and advantageously from 110 to 130° C., so as to evaporate water therefrom. There is recovered water containing ammonia, sulfurous anhydride and, in some cases, carbon dioxide which is fed back to the absorbing unit of the first stage, and ammonium thiosulfates in a dry state.

In a third stage, the ammonium thiosulfates are heated to a temperature usually from 170 to 300° C. and preferably from 180 to 200° C. when operating under atmospheric pressure so as to decompose them to sulfur which is separated and to sulfur dioxide, ammonia and water, which are recycled to the first stage of the process. It may be required to add a make up of $SO_2$ so that, in the first stage, the conversion of the $H_2S$ contained in the treated gas be complete. This make up may be obtained, for example, by combustion of a portion of the formed sulfur of the third stage. In some cases, it is possible to operate at 150° C.

The second and third stages of the process may be carried out simultaneously, the effluents being fed back, after cooling, to the absorbing unit.

The occurring reactions may be expressed by the following schemes:

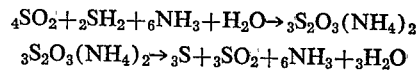

$$3S_2O_3(NH_4)_2 \rightarrow 3S + 3SO_2 + 6NH_3 + 3H_2O$$

Each stage of the process may be carried out at a pressure selected at will; it is however preferred to operate under a pressure close to the normal pressure, or under a pressure which is not very different from the atmospheric one, for example a pressure from 0.5 to 3 bars.

The invention will be further illustrated by the accompanying drawing relating to a non limitative example of an embodiment thereof.

The gas to be purified, which contains $CO_2$ and $H_2S$, is fed through a duct 1 to the absorption column 2 and the aqueous absorbing solution is introduced through line 3. This solution contains 400 g./liter of a mixture by equal parts of ammonium neutral and hydrogen sulfites. The purified gas evolves through stack 4. Line 3 is used for recycling the absorbing solution through the column and is provided with a thermal exchanger 15. The solution of high thiosulfate content is transferred through line 5 to a drying chamber 6.

The vaporized water issues through lines 7 and 10 and is sent to column 2. The drying chamber is provided at its lower part with a funnel connected to pipe 16 through which the dry thiosulfate is discharged. This thiosulfate is introduced into a reactor 8 where it is decomposed, by heating, to $SO_2$, $NH_3$ and $H_2O$ which are sent through line 9 to the pipe 10 also conveying the water coming from line 7, before being reintroduced into the absorption column 2. The sulfur flows down from the bottom of reactor 8 through line 11. A portion thereof is withdrawn through line 12 and fed to a burner 13 provided with an air inlet 14 so as to be converted to $SO_2$ which is collected, for example, through line 17 and reactor 8, together with the ammonium thiosulfate decomposition products, discharged through line 9.

EXAMPLE 10,000 Nm.³/hour of a gas, consisting of 99% by volume of $CO_2$ and 1% by volume of $H_2S$ are treated in an absorbing unit at a temperature of 40° C., by means of an aqueous solution of ammonium sulfite containing 140 g./liter of ammonium hydrogen sulfite and 150 g./liter of ammonium neutral sulfite. This solution is recycled through line 3.

From the bottom of the column, there is recovered a solution of ammonium thiosulfate at a concentration of 350 g./liter.

The water is separated from the thiosulfate and, when the latter is dry, it is introduced into an oven where the temperature is 185° C. and the pressure is the atmospheric one. It is thus decomposed, and there are recovered sulfur which flows down from the bottom of the oven and a gaseous effluent containing $SO_2$, $NH_3$ and $H_2O$ which is sent to the absorber together with a make up of $SO_2$, produced by a burner in which a portion of the produced sulfur is burnt in the presence of air.

From the top of the absorbing unit, there is recovered an effluent consisting of $CO_2$ having a 100 p.p.m. by volume $H_2S$ content.

What I claim as this invention is:

1. A process for removing hydrogen sulfide contained in a gas of high carbon dioxide content, comprising the steps of:
    (a) contacting said gas with an aqueous solution of ammonium sulfite at about 0 to 90° C. to form a solution of ammonium thiosulfate,
    (b) drying the solution of ammonium thiosulfate to obtain solid ammonium thiosulfate,
    (c) heating the solid ammonium thiosulfate from step (b) at a temperature of from 170 to 300° C. thereby to convert it to sulfur, ammonia, sulfur dioxide and water, separating the formed sulfur, withdrawing the ammonia, the sulfur dioxide and the water and recycling them to the step (a) for regenerating the ammonium sulfite solution.

2. A process according to claim 1 wherein a portion of the obtained sulfur is used for producing $SO_2$ and wherein the formed $SO_2$ is used for compensating the sulfur compounds losses of the absorbing solution.

3. A process according to claim 1, wherein in the stage (a), the molar ratio $H_2S/SO_2$ is from 0.2 to 1.

4. A process according to claim 1, wherein in stage (a), the molar ratio $H_2S/SO_2$ is about 0.5.

5. A process according to claim 1, wherein in stage (a), the molar ratio $NH_3/SO_2$ is from 1.4 to 2.

6. A process according to claim 1, wherein in stage (a), the molar ratio $NH_3/SO_2$ is about 1.5.

7. A process according to claim 1, wherein the temperature of stage (b) is from 80° to 170° C.

8. A process according to claim 1, wherein the temperature of stage (b) is from 80 to 170° C. and that of stage (c) is from 180 to 200° C.

9. A process according to claim 1, wherein the pressure in each stage is from 0.5 to 3 bars.

10. A process according to claim 9, wherein the pressure is about atmospheric.

References Cited
UNITED STATES PATENTS

| | | | |
|---|---|---|---|
| 1,795,121 | 3/1931 | Hansen | 423—574 |
| 1,795,120 | 3/1931 | Hansen | 423—222 |
| 1,953,478 | 4/1934 | Hansen | 423—220 |
| 3,383,170 | 5/1968 | Furkert et al. | 423—541 |

OSCAR R. VERTIZ, Primary Examiner

G. P. STRAUB, Assistant Examiner

U.S. Cl. X.R.

423—222, 242, 356, 514, 541